United States Patent Office 3,647,913
Patented Mar. 7, 1972

3,647,913
PURIFICATION OF OLEFINS
Evalds Lasis, Sarnia, Ontario, Canada, assignor to Polymer Corporation Limited, Sarnia, Ontario, Canada
No Drawing. Filed July 27, 1970, Ser. No. 58,669
Claims priority, application Canada, Sept. 8, 1969, 61,363
Int. Cl. C07c 7/02
U.S. Cl. 260—681.5                                    11 Claims

ABSTRACT OF THE DISCLOSURE

Impure olefin streams of, e.g., butadiene, intended for polymerization, are purified to remove impurities harmful in subsequent polymerization, such as acetylenes and cumulative diolefins, by treating them with catalysts which selectively polymerize the impurities to solid, readily removable products, whilst leaving the olefin unaffected. An example of a suitable catalyst is a mixture of ferrous octoate and aluminum triethyl.

This invention relates to methods for purification of olefinc hydrocarbons, particularly to the purification of olefinic hydrocarbons intended for polymerization.

In commercial operations, olefinic hydrocarbons are generally obtained from the cracking of crude petroleum followed by subsequent distillation of the cracked products. These operations serve to divide the petroleum products into fractions comprising one or more dominant hydrocarbons as desired. However, substantially pure hydrocarbons are not produced by these processes, without long, tedious and consequently prohibitively expensive repeated fractional distillations of the fractions.

Butadiene-1,3 is a typical example of an olefinic hydrocarbon which is derived from crude petroleum, and is used for polymerization purposes, to make synthetic rubber and plastics. For commercial purposes, butadiene-1,3 is obtained either directly from the steam cracking of naturally occurring hydrocarbons, or by catalytic dehydrogenation of butylenes or butanes, which are obtained directly from cracking of natural hydrocarbons. In either case butadiene-1,3 is obtained in an impure state.

Many of the impurities which commonly contaminate commercial butadiene-1,3 are harmful in the process of polymerizing butadiene-1,3 to produce synthetic rubber and plastics. Among those commonly occurring, harmful impurities which must be substantially removed prior to polymerization of the butadiene-1,3 are cumulative olefins such as butadiene-1,2 and various acetylenes such as propyne, butyne-1, butyne-2, and vinyl acetylene. A number of processes have been proposed and used in the past for the removal of these impurities. One such process involves selective solvent extraction using cuprous ammonium acetate solution. This process is fairly effective for removal of α-acetylenes, but is virtually ineffective for removing β-acetylene and butadiene-1,2. Another process uses extractive distillation with, for example, acetonitrile, N-methylpyrrolidone or dimethyl formamide. Similar comments apply to the efficiency of this process as apply to the cuprous ammonium acetate process. Mild hydrogenation has been tried, but this tends to hydrogenate some of the butadiene-1,3 to butylenes, which detracts from any merits the process might have in removing acetylenes. A fourth method involves selective absorption of the harmful impurities on solid surfaces such as cuprous chloride. While effective, this method has proved prohibitively expensive.

The same problems are encountered in preparing other polymerizable olefins for polymerization. Commercially available monomers such as propene, butene, pentene, isoprene, pentadiene-1,3 and styrene are commonly contaminated with highly unsaturated impurities such as acetylenes of a closely similar molecular weight. Acetylenes even in very small amounts will interfere in subsequent polymerization of these monomers, particularly where the monomers are to be polymerized using so-called Ziegler catalysts, Szwarc catalysts and ionic catalysts.

It is an object of the present invention to provide a process for treatment of an olefinic hydrocarbon whereby the amounts of impurities harmful in subsequent polymerization of the olefinic hydrocarbon are significantly reduced.

This invention is based on the discovery of certain compositions which are catalytically active to polymerize at least some of the commonly encountered harmful impurities in commercially available hydrocarbons, but which do not cause polymerization of the olefinic hydrocarbons themselves. The impurities are thus converted to a physical state in which they may be removed from the unchanged, desired olefinic hydrocarbons by simple means. Alternatively, since the polymerized forms of the impurities are not harmful to the subsequent polymerization process of the olefinic hydrocarbon, they need not be removed therefrom.

According to the present invention, therefore, there is provided a process of reducing the amount of fluid impurities in an olefinic hydrocarbon, which comprises contacting the impurity-containing olefinic hydrocarbon, in the substantial absence of halogenated substances, with a composition comprising:

(a) a hydride or hydrocarbyl compound of a metal of Group 1–A, 2–A, 2–B or 3–A of the Periodic Table, and (b) a compound of a transition metal of Group 4–B, 5–B, 6–B, 7–B or 8 of the Periodic Table, said composition being free of non-complexed chloride, bromide, and iodide and free of Lewis acid.

The compound (a) of the composition used in the invention may be a hydride or hydrocarbyl compound of lithium, sodium, potassium, rubidium, cesium, beryllium, magnesium, calcium, strontium, barium, zinc, cadmium or mercury. Suitable compounds include hydrides, alkyls, alkyl fluorides, oxyhydrocarbyls, thiohydrocarbyls and aminohydrocarbyls of the metals, for example lithium butyl, zinc diethyl, aluminum triethyl, aluminum diethyl monofluoride, lithium aluminum hydride, aluminum tri-isobutyl, sodium borohydride, calcium hydride, and compounds of general formulae $Al.R.R'OR''$, $Al.R.R'SR''$, and $Al.R'R''NR_2$, where each R represents a lower alkyl group. The compounds must be free of chloride, bromide and iodide groups; as noted, however, fluoride groups are acceptable, in an uncomplexed form.

The compound (b) of the composition used in the invention may be a compound as above-defined of titanium, zirconium, hafnium, vanadium, niobium, tantalum, chromium, molybdenum, tungsten, managanese, rhodium, iron, cobalt, nickel, palladium, osmium, platinum, uranium and cerium. These compounds must be free of chloride, bromide and iodide groups unless such groups exist in a complexed form, for example neutralized with an amino compound to form a co-ordination complex, in which the group is not free to ionize readily. Ferric chloride complexed with pyridine is an example of such a complex. Particularly suitable are hydrocarbon soluble organic compounds of the metals iron, cobalt, nickel, titanium, chromium, vanadium, manganese and zirconium, especially salts of these metals with C4 to C24 carboxylic acids. Specific examples of preferred compounds (b) include ferrous octoate, ferric stearate, nickelous octoate, cobaltous octoate, cobaltous naphthenate, cobaltic octoate, manganous octoate, chromous octoate, vanadous octoate, tetra-n-butyl zirconate, and iron acetyl acetonate.

An important condition for the process of the present invention is that the composition should be free of Lewis acids. If one of the catalytic components is too highly acidic, the composition becomes ineffective for polymerizing acetylenes and may polymerize olefinic hydrocarbons instead. Thus it has been found that compounds such as aluminum diethylchloride are not satisfactory, presumably on account of their acidity. For the same reason, the process of the present invention is not conducted in the presence of halogenated diluents, which will tend to interact with compound (a) to give rise to acidic compounds.

The relative proportions of compounds (a) and (b) can vary over a wide range. The molar ratio of compound (a) to compound (b) may be anywhere from about 0.5:1 up to about 100:1. This ratio is preferably from about 1:1 to about 5:1. The absolute amount of active catalytic composition can be very small and is not dependent upon the amount of impurities of which it catalyzes the polymerization, up to about 1% by weight of olefinic feed. The composition tends to be deactivated by moisture, oxygen and oxygen, sulfur and nitrogen containing compounds, but if these are absent from the olefinic hydrocarbon feed being treated, as little as one part by weight of composition per 20,000 parts by weight of olefinic feed can be used. If water, oxygen and oxygen containing compounds are present, more composition should be used to allow for deactivation of part of the composition. Thus, the amount of active composition should be greater, on a molar basis, than the combined amount of water and oxygen containing impurities in the feed.

Treatment of the olefinic hydrocarbon feeds with the active compositions according to the present invention can take place over a wide range of temperatures and pressures. It is however preferred that the olefinic hydrocarbons remain in the liquid phase for this treatment, and so the temperature and pressure are preferably chosen with this in view. The temperature range of treatment for butadiene-1,3 is suitably from about 0° C. to about 150° C., and preferably from about 20° C. to about 100° C. Similarly, the time for which the impurity-containing olefinic hydrocarbon feed contacts the active composition can vary over a wide range, suitably from about one minute to about 24 hours. Longer times should be avoided since some of the compositions tend to polymerize the olefins after long periods of time in contact therewith. The preferred time of contact is from about 5 minutes to about 5 hours.

Treatment may take place in the presence or absence of solvents for the olefinic hydrocarbon feed, although as noted previously halogenated solvents must be absent. When the olefins are subsequently to be polymerized in solution in an organic hydrocarbon solvent, the treatment according to the present invention may be performed on the feed dissolved ready for subsequent polymerization. Alternatively, the treatment according to the present invention may take place in the absence of solvents or diluents, suitably in storage vessels provided for the hydrocarbon feed. The treatment may be carried out continuously or batchwise.

The acetylenes and cumulative diolefins present in the olefin feed are converted by the process of the present invention to high molecular weight solid materials. If desired, these solid products can be removed from the olefin feed by simple physical means, such as decantation or distillation. However, since the solid products so formed are inactive and harmless in subsequent polymerizations, they do not need to be removed prior to polymerization of the olefins. The product stream from the process of the present invention can be used directly as the monomer source in polymerization.

On grounds of efficiency, economy and ease of handling, the following specific compositions are the most preferred for use in the present invention:

aluminum triethyl and ferrous octoate;
aluminum triethyl and ferric stearate;
aluminum triethyl and nickelous octoate;
aluminum triethyl and cobaltous octoate;
aluminum triethyl and cobaltous naphthenate;
aluminum diethyl fluoride and ferrous octoate;
zinc diethyl and ferrous octoate;
lithium butyl and ferrous octoate;
lithium aluminum hydride and ferrous octoate;
aluminum triethyl and vanadous octoate.

It has also been found that some of the catalytic compositions of the present invention are effective to polymerize α-acetylenes, but substantially ineffective to polymerize cumulative diolefins of closely similar molecular weight. This provides a useful process for purifying, for example, butadiene-1,2 which is often used in carefully controlled amounts as a polymerization modifier in the polymerization of butadiene-1,3. For such use, the butadiene-1,2 needs to be free of α-acetylenes which are particularly harmful in polymerization using Ziegler catalysts. For this purpose, compositions of chromium compounds, vanadium compounds, manganese compounds and zirconium compounds with aluminum trialkyls are most effective.

The invention will be further illustrated with reference to specific examples.

In the example, olefinic hydrocarbon feeds typical of those commercially available for polymerization processes were used. The feeds were analyzed before and after treatment according to the present invention by a Gas Chromatogram method. The actual apparatus used was a Varian Aerograph Model 1520B, equipped with a back flush valve. The column, a copper tubing 18 feet in length and ¼" O.D. was packed with dimethyl sulfolane and 30 to 60 mesh chromosorb P in a 20:100 weight ratio. The carrier gas stream into which the liquids were volatilized was helium, and had a flow rate of 120 mls. per minute. The inlet temperature was maintained at 180° C. and the column temperature was 25° C. The separated components were detected by measuring thermal conductivity changes at the column outlet.

Using this apparatus under these conditions, and working with a predominantly butadiene-1,3 hydrocarbon feed stream, it was possible to detect the presence of individual C4 acetylenes down to a lower limit of 7 parts per 1,000,000 of the liquid feed mixture, under certain circumstances. Butadiene-1,2 could be detected down to a lower limit of 25 parts per 1,000,000 of total feed mixture. These figures therefore indicate the accuracy of the quantitative measurements reported in the examples, and also indicate how low the content of these compounds is, when reported as "not detected."

EXAMPLE 1

In this example, a commercial impure mixed olefin stream obtained directly from a conventional catalytic butylene dehydrogenation process was treated according to the present process. The feed stream contained 34.9% by wt. of butadiene, 58.5% by wt. of a mixture of C₃–C₄ monoolefins and 6.6% wt. of saturated C₄–C₅ hydrocarbons. A sample of the feed was analyzed separately for the presence of harmful impurities (acetylenes and cumulative diolefins) inhibiting or interfering with the polymerization of monoolefins and conjugated diolefins.

The catalyst used for treatment according to the process of the present invention was a mixture of 0.12 millimol of ferrous octoate and 0.5 millimol of aluminum triethyl. The catalyst components were first mixed together and then added to a bottle containing 50 mls. of the hydrocarbon feed. After contacting the catalyst for 30 minutes at 57° C., the treated liquid hydrocarbon feed was analyzed as before, with the results shown in Table I.

TABLE I

|  | Before treatment | After treatment |
|---|---|---|
| Feed composition (percent by wt.): |  |  |
| Propene | 0.12 | Not changed within the limits of test reproducibility. |
| Pentane | 0.13 | Do. |
| Isobutane | 0.04 | Do. |
| n-Butane | 6.41 | Do. |
| Butene-1 | 16.14 | Do. |
| Isobutylene | 7.93 | Do. |
| Trans-butene-2 | 19.32 | Do. |
| Cis-butene-2 | 15.00 | Do. |
| Butadiene-1,3 | 34.9 | Do. |
| Trace impurities (parts by weight per million parts of butadiene-1,3): |  |  |
| Butadiene-1,2 | 2,400 | Not detected. |
| Propyne | Traces | Do. |
| Butyne-1 | 694 | Do. |
| Isoprene | 105 | 200. |
| Butyne-2 | 1,420 | Not detected. |
| Vinyl acetylene | 83 | Do. |

The overall quantity of olefinic hydrocarbons such as propylene, butene-1, butene-2, isobutylene in the treated sample remained unchanged within the limits of test reproducibility. No evidence of butadiene-1,3 polymerization could be detected. Acetylenic impurities and butadiene-1,2 were reduced below the limit of detection.

EXAMPLE 2

To demonstrate the superiority of the process of the present invention over the conventional process of purifying olefins with cuprous ammonium acetate solution (CAA process) a sample of feed used in Example 1 was first subjected to the CAA process and its amounts of harmful impurities determined, and then subjected to the process of the present invention (catalyst components and conditions of treatment as in Example 1) and its amounts of harmful impurities again measured. The feed can be reasonably assumed to have approximately the composition given in Table I, prior to either of these treatments. The results are shown in Table II.

TABLE II

| Substance | Butadiene-1,3 | Butadiene-1,2 | Butyne-1 | Butyne-2 | Vinyl acetylene |
|---|---|---|---|---|---|
| Initial amount (p.b.w.) | 1,000,000 | 2,300 | 960 | 2,000 | 1,300 |
| Amount after CAA (p.b.w.) | 1,000,000 | 2,400 | 694 | 2,010 | 300 |
| Amount after invented process (p.b.w.) | 1,000,000 | (¹) | (¹) | (¹) | (¹) |

¹ Not detected.
NOTE.—p.b.w.=parts by weight.

From these figures it can be seen that the CAA process has some effect on the levels of butyne-1 and vinyl acetylene, but no effect on butadiene-1,2, a cumulative diolefins, or butyne-2, a β-acetylene. The process of the present invention essentially removes all of these substances, by polymerizing them to solid form, while leaving the desired butadiene-1,3 unaffected.

EXAMPLE 3

A series of experiments were conducted on samples of a dilute butadiene-1,3 olefinic hydrocarbon feed similar to that used in Example 1, with various molar ratios of catalyst components, the treatments being conducted for various times and at various temperatures. The catalyst components used in each case were aluminum triethyl and ferrous octoate. The analyses of the feeds were carried out by Gas Chromotography as previously described. In each case, 50 mls. of the olefin feed was used, and 0.25 millimol of aluminum triethyl was used. The amount of ferrous octoate was varied to give the molar ratios recorded. The results are given in Table III.

Where no figure is reported in the composition columns, it indicates that the presence of the particular compound could not be detected. In all cases, this means that less than 40 parts per 1,000,000 of the compound, based on the weight of butadiene-1,3, was present. No evidence of butadiene-1,3 polymerization could be detected.

EXAMPLE 4

Other catalyst compositions within the scope of the present invention were used to remove, from butadiene-1,3 containing hydrocarbon feeds, substantial proportions of one or more of the harmful impurities butyne-1, butyne-2, vinyl acetylene and the butadiene-1,2. The olefin feed sample was first charged to the polymerization bottle, followed by compound (a) in solution in heptane, then followed by compound (b) in solution in benzene. The experiments were carried out as previously described,

TABLE III

| Al:Fe, mole ratio | Temperature, °C. | Time, hrs. | Composition, parts by weight | | | | |
|---|---|---|---|---|---|---|---|
| | | | Butadiene-1,3 | Butadiene-1,2 | Butyne-1 | Butyne-2 | Vinyl acetylene |
| | | | 1,000,000 | 2,060 | 670 | 1,990 | 80 |
| 2 | 21 | ½ | 1,000,000 | | | 1,100 | |
| 2 | 21 | 1 | 1,000,000 | | | 575 | |
| 2 | 21 | 2 | 1,000,000 | | | 420 | |
| 2 | 21 | 18 | 1,000,000 | | | | |
| 4 | 57 | ½ | 1,000,000 | | | 172 | |
| 2 | 57 | ½ | 1,000,000 | | | | |
| 1.4 | 57 | ½ | 1,000,000 | | | | |
| 1 | 57 | ½ | 1,000,000 | | | 254 | |
| 4 | 57 | 1 | 1,000,000 | | | 183 | |
| 2 | 57 | 1 | 1,000,000 | | | | |
| 1.4 | 57 | 1 | 1,000,000 | | | | |
| 1 | 57 | 1 | 1,000,000 | | | 61 | |
| 4 | 57 | 1½ | 1,000,000 | | | | |
| 2 | 57 | 1½ | 1,000,000 | | | | |
| 1.4 | 57 | 1½ | 1,000,000 | | | | |
| 1 | 57 | 1½ | 1,000,000 | | | | |
| 2 | 93.5 | ½ | 1,000,000 | | | | |
| 2 | 74 | 1/12 | 1,000,000 | 32 | 41 | 1,130 | |
| 2 | 74 | ¼ | 1,000,000 | | | 300 | |
| 2 | 74 | ½ | 1,000,000 | | | | | and the results are given in Table IV. The amounts of impurities are reported as parts per 1,000,000 based on the weight of butadiene-1,3.

TABLE IV

| Catalyst compound (a) | Catalyst compound (b) | Mole ratio, (a):(b) | Time of treatment (hrs.) | Temperature, °C. | Composition | | | |
|---|---|---|---|---|---|---|---|---|
| | | | | | Butadiene-1,2 | Butyne-1 | Butyne 2 | Vinyl acetylene |
| Aluminum triethyl | Nickelous octoate | 8.3:1 | 16 | 21 | 2,090 | 780 | 2,050 | 300 |
| Do | Cobaltous octoate | 4.1:1 | 16 | 21 | 100 | 185 | 2,030 | |
| Do | Cobaltous naphthenate | 4.1:1 | 16 | 21 | | | 130 | |
| Do | Chromous octoate | 8.3:1 | 16 | 21 | 1,700 | | 700 | |
| | | | | | | | 1,560 | |

These results show that all of the above catalyst compositions are effective in substantially reducing the quantity of at least one of the harmful impurities. In addition, none of the compositions showed any tendency to polymerize butadiene-1,3, despite being in contact therewith for a period of sixteen hours. It will also be noted that the composition of aluminum triethyl and chromous octoate is effective in removing α-acetylenes, but has little effect on butadiene-1,2. The composition can therefore be used to purify butadiene-1,2.

EXAMPLE 5

Further pairs of catalyst components were evaluated for reducing the amount of impurities which would interfere in subsequent butadiene-1,3 polymerization, from a butadiene-1,3 containing feed sample. The charging order and general procedure were as in Example 4, and the results are reported in Table V in a similar manner.

TABLE V

| Catalyst compound (a) | Catalyst compound (b) | Mole ratio, (a):(b) | Time of treatment (hrs.) | Temperature, °C. | Composition | | | |
|---|---|---|---|---|---|---|---|---|
| | | | | | Butadiene-1,2 | Butyne-1 | Butyne 2 | Vinyl acetylene |
| Aluminum triethyl | Ferric stearate | 8.3:1 | 16 | 21 | 2,060 | 670 | 1,990 | 80 |
| Do | Vanadous octoate | 4.1:1 | 16 | 21 | 1,970 | 135 | 99 | |
| Aluminum diethyl fluoride | Ferrous octoate | 5.5:1 | 16 | 21 | | | 1,800 | |
| Zinc diethyl | do | 13.3:1 | 16 | 21 | 1,780 | 625 | 94 | |
| Lithium butyl | do | 3.3:1 | 16 | 21 | 48 | | 2,000 | |
| Aluminum triethyl | Tetra-n-butyl zirconate | 3.47:1 | 16 | 21 | 1,930 | 87 | | |
| Aluminum diethyl fluoride | Cobaltous octoate | 5.5:1 | 16 | 21 | | | 1,720 | |
| Aluminum triethyl | Manganous octoate | 3:1 | 16 | 21 | 180 | | 1,053 | |
| Lithium aluminum hydride etherate | Ferrous octoate | 3.3:1 | 16 | 21 | | | | |

As shown in the above figures, all of the catalyst combinations gave significant reductions in the amounts of at least one of the harmful impurities. When no figure is recorded, the amount was undetectable by the gas chromatography method used, and so was less than 40 parts per 1,000,000. None of the above catalyst combinations caused polymerization of butadiene-1,3, despite contact for sixteen hours.

In addition the combinations aluminum triethyl and vanadous octoate, and aluminum triethyl and tetra-n-butyl zirconate, are effective in polymerizing the α-acetylenes, but leave the butadiene-1,2 substantially unaffected. They are therefore useful for purifying butadiene-1,2.

What is claimed is:

1. A process of reducing, by selective polymerization; the quantity of impurities in an aliphatic olefinic hydrocarbon said impurities being selected from the group consisting of acetylenes and cumulative diolefins which comprises contacting the impurity containing olefinic hydrocarbon, in the absence of halogenated substances, with a composition consisting of:

(a) a compound of a metal of Group 1-A, 2-A, 2-B or 3-A of the Periodic Table, said compound being selected from hydrides, alkyls, alkyl fluorides, oxyhydrocarbyls, thiocarbyls and aminohydrocarbyls, and (b) a compound of transition metal of Group 4-B, 5-B, 6-B, 7-B or 8 of the Periodic Table, said compound excluding uncomplexed chloride, bromide and iodide groups, the molar ratio of compound (a) to compound (b) being from about 0.5:1 to about 100:1, said contacting being at a temperature of from about 0° C. to about 200° C. for a time of from about 1 minute to about 24 hours, to selectively polymerize said impurities.

2. The process of claim 1, wherein at least one part by weight of the composition is contacted with up to about 20,000 parts by weight of the impurity containing olefinic hydrocarbon.

3. The process of claim 1, wherein the compound (a) is selected from lithium butyl, zinc diethyl, aluminum triethyl, aluminum diethyl monofluoride, lithium aluminum hydride, aluminum triisobutyl, sodium borohydride and calcium hydride.

4. The process of claim 1, wherein the compound (b) is a $C_4$ to $C_{24}$ carboxylic acid salt of a metal selected from iron, cobalt, nickel, titanium, chromium, vanadium, manganese and zirconium.

5. The process of claim 4, wherein the compound (b) is a compound of iron, nickel or cobalt and the molar ratio of compound (a) to compound (b) is from about 1:1 to about 5:1.

6. The process of claim 1, wherein the composition is contacted with the impurity containing olefinic hydrocarbon under conditions such that the olefinic hydrocarbon remains in the liquid phase.

7. The process of claim 1, wherein the impurity containing olefinic hydrocarbon is contacted with the composition for a time of from about 5 minutes to about 5 hours.

8. The process of claim 1, wherein the olefinic hydrocarbon is a butadiene-1,3 hydrocarbon containing feed contaminated with acetylenic and cumulative diolefin impurities.

9. The process of claim 1, wherein the olefinc hydrocarbon is butadiene-1,2 containing feed and the composition comprises (a) an aluminum trialkyl and (b) a compound of chromium, vanadium, ziroconium or manganese.

10. The process of claim 1, wherein the fluid impurities are selected from vinyl acetylene, butyne-1, butyne-2, butadiene-1,2 and mixtures thereof.

11. The process of claim 10, wherein the fluid impurities are polymerized and the olefinic hydrocarbon is subsequently polymerized.

References Cited

UNITED STATES PATENTS

| | | | |
|---|---|---|---|
| 3,505,425 | 4/1970 | Jones et al. | 260—683.15 D |
| 2,990,434 | 6/1961 | Smith | 260—681.5 |

DELBERT E. GANTZ, Primary Examiner

V. O'KEEFE, Assistant Examiner

U.S. Cl. X.R.

260—677 A